United States Patent [19]

Bowen et al.

[11] 4,190,077
[45] Feb. 26, 1980

[54] MICROWAVE APPLIANCE VALVE

[75] Inventors: Robert F. Bowen, Burlington; Philip A. Knight, Jr., Concord, both of Mass.

[73] Assignee: Raytheon Company, Lexington, Mass.

[21] Appl. No.: 8,352

[22] Filed: Feb. 1, 1979

Related U.S. Application Data

[63] Continuation of Ser. No. 813,034, Jul. 5, 1977, abandoned.

[51] Int. Cl.² ............... G05D 23/02; A47J 31/00
[52] U.S. Cl. .................... 137/550; 99/305; 236/101 R
[58] Field of Search ............ 137/544, 549, 550, 571; 251/144; 99/300, 305, 307; 236/93 R, 101 R

[56] References Cited

U.S. PATENT DOCUMENTS

| 389,420 | 9/1888 | Sutton | 137/550 X |
|---|---|---|---|
| 738,726 | 9/1903 | Lytle | 137/549 X |
| 1,842,066 | 1/1932 | Boyer | 251/144 X |
| 2,788,639 | 4/1957 | Kraft | 236/93 |
| 3,108,610 | 10/1963 | De See | 137/550 X |
| 3,443,693 | 5/1969 | Biermann | 137/550 X |
| 3,972,273 | 8/1976 | Carlson et al. | 99/300 |
| 4,025,042 | 5/1977 | Doherty, Jr. et al. | 236/87 X |

Primary Examiner—William R. Cline
Attorney, Agent, or Firm—M. D. Bartlett; J. D. Pannone; H. W. Arnold

[57] ABSTRACT

A fluid valve for a beverage-making appliance such as a coffee brewer, for example, which valve comprises a housing which contains a valve actuating means and which is closed at its inlet end by a filter, the filter being dome-shaped and having a small central aperture whereby air bubbles in a fluid within the valve may escape upwardly and out so that the valve may be used in appliances subject to microwave radiation.

6 Claims, 4 Drawing Figures

U.S. Patent    Feb. 26, 1980    4,190,077
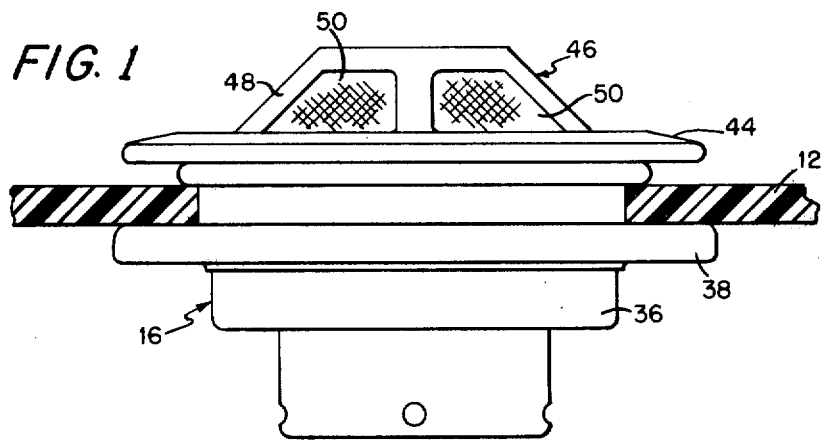
FIG. 1
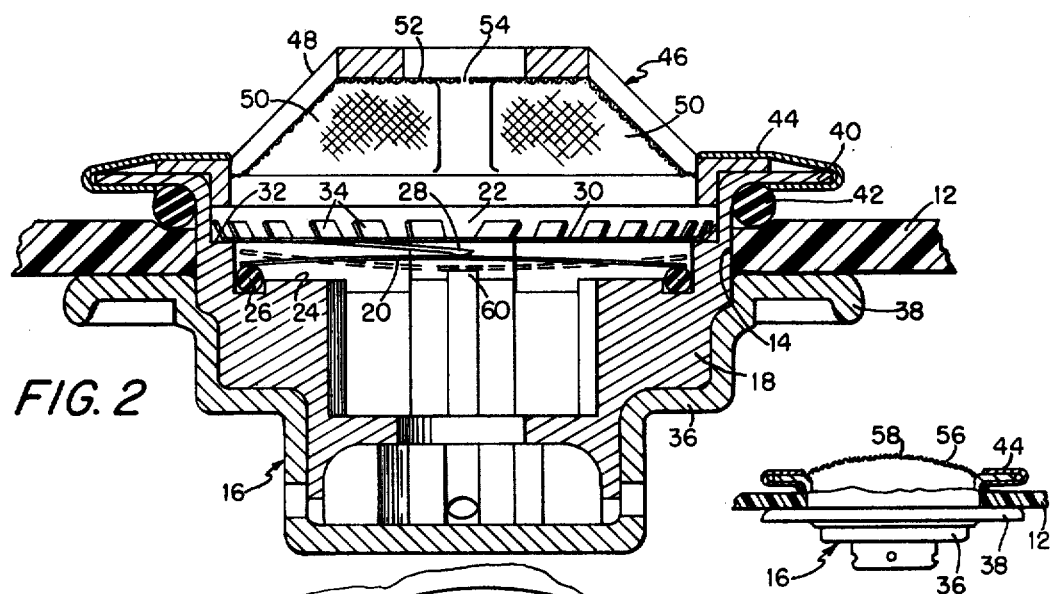
FIG. 2
FIG. 4
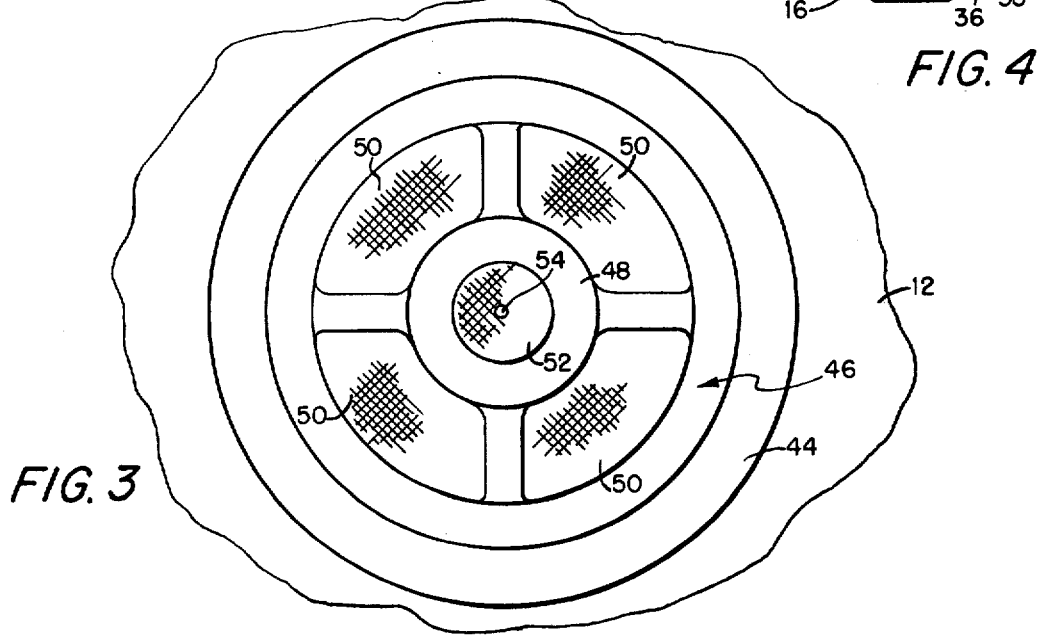
FIG. 3

MICROWAVE APPLIANCE VALVE

CROSS-REFERENCE TO RELATED CASES

This is a continuation of application Ser. No. 813,034, filed July 5, 1977, now abandoned.

BACKGROUND OF THE INVENTION

In the manufacture of appliances such as hot beverage makers and, more particularly, coffee brewers, it has become desirable to employ microwave energy as the source for heating the fluid used for making the beverage. Such devices require the use of a valve to control the flow of the fluid from one portion of the device to a second portion. Such a valve may be made of a plastic housing containing an actuator of metal, such as a bimetal element, which operates at selected temperature levels. Other valves may be made entirely of plastic or entirely of metal and may be thermally or manually actuated.

One particularly desirable thermally actuated valve for normally heated beverage making appliances is shown and described in U.S. Pat. Nos. 3,972,273 and 4,025,042. These are valves which are located in the bottom or base of a reservoir or other fluid container and which are adapted to be opened at a predetermined temperature when the fluid is heated. Although not shown in these patents, the upper or inlet end of the valves are usually closed by a filter which prevents particles in the fluid from interfering with the proper closure of the valve. Such filters generally comprise flat metal or plastic screens which are suitably affixed at their peripheries to the valve housing above the working parts of the valve.

It has been found that air often becomes entrapped beneath the screen, causing serious problems when microwave radiation is used as the source for heating the fluid in the reservoir. The entrapped air, in the form of bubbles, is of a different dielectric constant than the fluid and reacts differently to the microwave energy, causing localized heating in the area of the valve. This is particularly undesirable in valves which utilize a bimetal temperature-sensitive actuator which will sometimes become opened prematurely. In a coffee brewer, for example, such premature opening of the valve will expose the coffee grounds to water that is at a temperature lower than the minimum acceptable level for proper coffee brewing. Because the placement of the air bubbles within the valve assembly is subject to chance, the heating pattern is highly variable, causing erratic valve behavior.

SUMMARY OF THE INVENTION

The above and other disadvantages in bimetal valves for beverage makers heated by microwave energy are overcome by the present invention wherein the filter is removed from the immediate area of the working parts of the valve. This allows the air bubbles trapped by the wetting action of the filter screen to be also located away from the temperature-sensitive parts of the valve, thereby preventing inconsistent valve operation.

The filter screen is preferably sloped such as by providing it with a domelike configuration, and is also preferably provided with a small aperture at its apex so that the air bubbles will move to the top of the filter and escape through the aperture. Thus, no air remains in the valve structure to conceivably act as an insulator between the valve and the fluid it is monitoring.

BRIEF DESCRIPTION OF THE DRAWINGS

The above and other objectives of this invention will become apparent from the following description taken in connection with the accompanying drawings, wherein FIG. 1 is an elevational view of a valve embodying the invention;

FIG. 2 is enlarged axial sectional view of the valve shown in FIG. 1;

FIG. 3 is a plan view of the valve; and

FIG. 4 is a reduced elevational view partly in section illustrating a modified valve filter.

DESCRIPTION OF THE PREFERRED EMBODIMENT

Referring more particularly to the drawings, there is shown in FIG. 1 the bottom wall or base 12 of a reservoir or other suitable container which forms a part of a beverage maker or other device. Bottom wall 12 has an aperture 14 in which is disposed a thermally operable fluid valve 16. The device is adapted to be subjected to heat whereupon at a predetermined temperature the valve will open and fluid in the reservoir will flow out through the valve.

Referring to FIG. 2, the exemplary valve 16 shown is of the dump-type comprising a housing 18 containing metal valve parts including a bimetal actuator disc 20. The housing 18 may be of metal or of any suitable plastic such as a thermosetting synthetic resin, and has a central passage 22 therethrough with an inlet at the top and an outlet at the bottom. At a midpoint internally of the passage 22 the housing is provided with a circumferential shoulder 24 on which rests a resilient O-ring 26 of rubber or plastic. The bimetal disc 20 is normally convex and has its peripheral edge supported on the O-ring 26.

A resilient spring member 28 engages the upper surface of the disc 20, biasing the disc toward the O-ring and holding it in positive seal therewith to prevent fluid in the reservoir above the disc from flowing through the passage 22. Spring member 28 is an arm which is struck from the central portion of a retainer disc 30 which is formed of a resilient flexible material such as spring stainless steel or the like. Disc 30 is seated on a second shoulder 32 and spaced above bimetal disc 20 as shown. The slot in retainer disc 30 resulting from the striking of spring arm 28 serves as an opening through which fluid may flow. The retainer disc 30 is also provided with integral spring tabs 34 spaced by slots at intervals throughout its periphery which resiliently engage the inner wall of the housing to lock the disc 30 in position. Water may also flow between the tabs 34 through the slots therebetween.

At a first predetermined temperature the bimetal disc 20 is automatically abruptly movable over center in a snapping action to the concave configuration shown by dotted lines in FIG. 2. In this second position the marginal area of disc 20 is bowed away from O-ring 26 to permit the flow of liquid through the housing and the center portion is supported on a pin 60. This disc 20 is automatically reversibly movable from the second curvature position back to the first curvature position to close the valve upon being subjected to a second predetermined temperature.

There is provided a metal casing 36 which encases a portion of the housing 18 beneath the reservoir base or bottom 12. An outwardly turned flange 38 on the upper end of the casing 36 engages the under surface of reservoir base 12. The upper end of the housing 18 extends above the reservoir base 12 and has an outwardly directed peripheral flange 40 which overlies the upper surface of the base 12. A resilient O-ring or other gasket 42 is disposed between the flange 40 and adjacent upper surface of the base 12 to provide a fluid seal therebetween. Flange 40 is overlaid with a U-shaped metal channel member 44 which has a rounded outer surface to prevent field concentrations.

A domed screenlike filter 46 is mounted over the top of the valve with its peripheral edge retained between the upper surface of housing flange 40 and the adjacent portion of the channel 44. The filter 46 in one form comprises a frame 48 of metal or plastic having side panels 50 and an upper panel 52. The sides of the frame 48 with panels 50 are inclined as shown so that air bubbles may move upwardly out of the region of the valve proper. The top panel 52 has a small aperture 54 through which the bubbles may escape.

In a modified version of the filter as shown in FIG. 4, the entire filter 56 comprises a convex screen seated throughout its periphery in the channel 44 and having a small aperture 58 at its peak for escape of bubbles.

It will be understood that this invention can be used with any valve structure which is to be utilized in a device subjected to microwave radiation. The operating parts of the valve may be of any selected type and do not in themselves constitute any part of this invention.

From the foregoing it will be apparent that all of the objectives of this invention have been achieved by the valve shown and described. It will also be apparent that various modifications and changes may be made by those skilled in the art without departing from the spirit of the invention as expressed in the accompanying claims. Therefore, all matter shown and described is to be interpreted as illustrative and not in a limiting sense.

What is claimed is:

1. A valve assembly for use in a microwave environment comprising a valve housing having a circumferential portion shaped to fit within an opening in the bottom of a microwave-transparent liquid-containing reservoir and having a vertical passage therethrough with an inlet portion at its upper end and an outlet portion at its lower end whereby liquid in the reservoir may flow downwardly through the passage, a bimetal valve member positioned in said passage and movable into and out of normally closed relation to the passage to control the flow of liquid downwardly therethrough, said inlet portion of the passage being open above the valve member to permit microwaves to contact liquid therein, and a filter mounted on the housing over said inlet portion of the passage, said filter being a screen of microwave-transparent material having a central portion overlying the valve member and bowed upwardly away from the valve member whereby air bubbles in the liquid within the passage between the valve member and filter may rise away from the vicinity of the valve member.

2. A valve assembly as set forth in claim 1 wherein said filter is provided with an aperture at its apex.

3. A valve assembly as set forth in claim 1 wherein said filter comprises a frame having a peripheral portion anchored to the housing and having an apertured end wall and apertured side walls connecting said end wall to the peripheral portion, the apertures in said end and side walls being covered by said screen.

4. A valve assembly as set forth in claim 3 wherein said housing has a flangelike end portion, said peripheral portion of the frame is mounted on said end portion, and a channel-shaped ring is mounted over said end portion and said peripheral portion to hold the filter in place.

5. A valve assembly as set forth in claim 3 wherein said screen has a peripheral edge portion, and said housing has a flangelike end portion, said peripheral portion of the frame is mounted on said end portion, and a channel-shaped ring is mounted over said end portion and said peripheral portion to hold the filter in place.

6. A valve assembly as set forth in claim 3 wherein the screen on said end wall has an aperture at its center whereby said air bubbles may escape from the filter.

* * * * *